Jan. 14, 1964   C. A. PULASKI ETAL   3,117,413
CUMULATIVE LAPSED TIME INDICATOR FOR HYDRAULIC SYSTEMS
Filed May 21, 1962

INVENTORS
CHARLES A. PULASKI
ROBERT S. KAFKA
BY
*[signature]*
ATTORNEY

United States Patent Office 3,117,413
Patented Jan. 14, 1964

3,117,413
CUMULATIVE LAPSED TIME INDICATOR FOR
HYDRAULIC SYSTEMS
Charles A. Pulaski, 19 Lynn Road, Port Washington, N.Y., and Robert S. Kafka, 2070 Mohican Trail, Maitland, Fla.
Filed May 21, 1962, Ser. No. 196,236
14 Claims. (Cl. 58—146)

he present invention relates to a time-lapse meter, and especially, to a time-lapse meter particularly adapted for use with hydraulic systems that operate under pressure, intermittently, to measure the cumulative operating time of the system.

In closed hydraulic systems that operate under a general fixed degree of rate of pressure, as in the lubricating systems of internal combustion and diesel engines, for instance, it is generally inconvenient and impractical to check on the fluid material of the system as to its continued suitability for use in the system, as by determining the extent of the physical or chemical changes in the lubricant as a result of prolonged use, or to check the working parts of the associated mechanism served by the lubricating system, to determine whether such parts require attention by way of adjustment, repair or replacement.

Heretofore, the determination of the time for attention to a hydraulic system or the mechanism which it serves, for the purposes aforesaid, was a matter of guesswork. It was determined either by total time lapse from a previous inspection or prior fluid change, or, as in the case of vehicle motors, on the basis of milage since an earlier attention to the motor or hydraulic system. Neither of these methods bears any direct relation to actual time of operation or the consequent actual period of wear and tear on the system or associated mechanism.

It is the object of the present invention to provide a metering device that may be installed in a hydraulic system that operates under a substantially constant pressure, as in a conduit of that system, and is responsive to the internal pressure of that system, which will measure, cumulatively, the time the hydraulic system is actually in use or operation, and thereby make possible determination of the time for giving attention to the system or associated mechanism on the basis of predetermined total time during which the system and its associated mechanism has been in actual operation.

It is also an object of the present invention to provide a metering device of the character described which is completely mechanical and does not involve any electrical components nor any chemical or physical changes or reaction on or within the system.

It is another object of the present invention to provide a time lapse metering device, of the character described, which is composed of relatively few, simple and sturdy parts that may be economically produced and assembled and will stand up during use and operate with certainty with a minimum of maintenance and care.

It is a further object of the present invention to provide a time lapse metering device, of the character described which may be readily and easily reset, after any metering period, to begin a new metering period and may, therefore, be used and reused numerous times.

It is a still further object of the present invention to provide a time lapse metering device of the character described, which may be installed at substantially any point in a hydraulic system where it affords maximum convenience for reading and inspection and for resetting.

The foregoing and other objects and advantages of the cumulative time lapse metering device of the present invention will become more readily apparent to those skilled in the arts from the embodiment thereof shown in the accompanying drawings and from the description following. It is to be understood, however, that such embodiment is shown by way of illustration only, to make the principles and practice of the invention more readily comprehensible, and without any intention of limiting the invention to the specific details herein shown.

Figure 1:
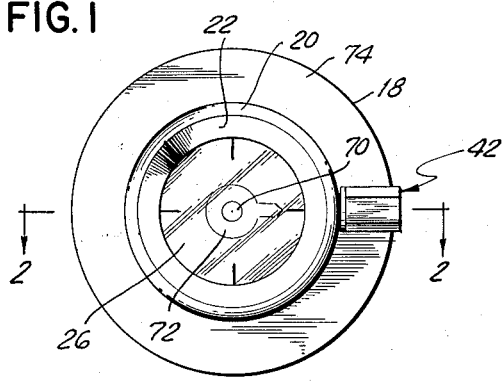
FIG. 1 is a top plan view of one embodiment of a time lapse metering device of the present invention.
Figure 3:
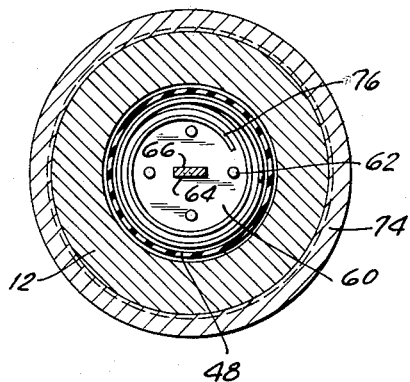
FIG. 3 is a section taken on line 3—3 of FIG. 2.
Figure 2:
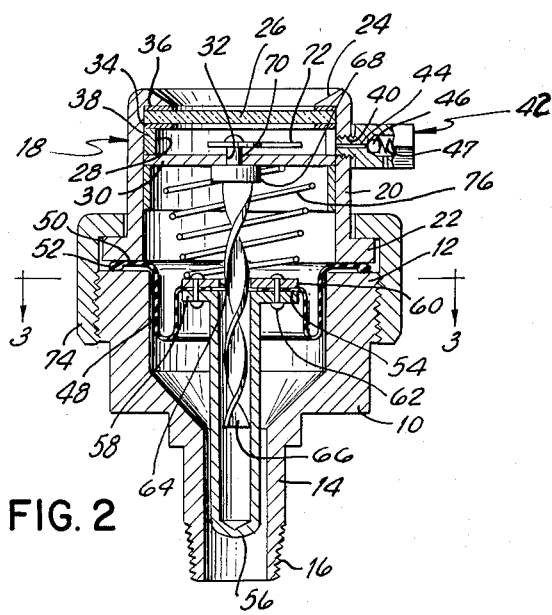
FIG. 2 is a vertical, sectional and partly elevational view of the same, taken substantially along the plane of line 2—2 of FIG. 1.

Generally stated, the present invention takes advantage of the fact that closed hydraulic systems, such as the lubricating systems of internal combustion and diesel engines, or the like, operate under pressure which is substantially fixed and constant during operation, except for a brief build up period. The invention utilizes a quantity of air that is trapped in an air-tight chamber which is partly collapsible and in which is set a one-way air-escape valve that allows but extremely air escape, at a predetermined rate for the known internal pressure of the system in which it is to be installed. The collapsible portion of the chamber is exposed to the internal pressure of the hydraulic system to compress the chamber and gradually force air out of it through the air-escape valve. Because the discharged air cannot be replaced, when operation is stopped, the collapsible part of the airtight chamber remains in its partly collapsed position, and the next time and each successive time the hydraulic system is set to operate, the airtight chamber is collapsed further from the point left off at the end of its previous period of operation, so that the action of air discharging and chamber collapsing is cumulative as a result of successive periods of operation of the hydraulic system.

The compressible or collapsible portion of the airtight chamber is operatively connected to a dial indicator that is gradually moved, as the compressible chamber part is successively collapsed, to indicate the degree of evacuation of the airtight chamber. Because of the known rate of air escape through the valve, such indicator movement shows the cumulative time of operation of the hydraulic system.

More specifically stated, and with reference to the embodiment of the invention shown in the accompanying drawings, the device of the invention comprises a supporting base, consisting of a hollow cylindrical body, 10, open at one end where it may, preferably, be provided with an outwardly thickened portion, 12, which is externally threaded. The base 10 is internally tapered at its other end and is gradually reduced in diameter to form a cylindrical nipple, 14, having a threaded end portion, 16, by which it may be threaded in a suitable opening provided in a conduit of a hydraulic system (not thought necessary to be shown), operating under pressure, such as the lubricating system of an internal combustion or diesel engine, or the like.

The metering device of the invention further comprises an airtight chamber which may be formed of a rigid cap portion, generally designated as 18, consisting of a cylindrical tubular body, 20, having an outwardly offset flange, 22, at one end, preferably of a diameter equal to that of the thickened end portion of the base 10, and an inwardly offset flange, 24, at its other end. The tubular body 20 has disposed therein, in abutment against the inner face of the flange 24, and in airtight relation therewith, a transparency, as of glass, 26, and, spaced inwardly from the transparency, to proide a chamber, 28, a partition, 30, which may serve as a dial and is formed with a central opening, 32, for the purpose hereinafter shown.

The airtight fit of the pane 26 may be effected by inner and outer washer rings, 34 and 36, respectively, fitted around the periphery of the pane, on each side thereof, and a split spacing ring, 38, held between the inner ring washer 34 and the dial partition 30. A threaded opening, 40, is formed in the tubular body 20, opposite the split or gap in the spacing ring 38, in which is held by its threaded nipple an air escape valve, generally designated as 42, which is formed with a very fine air passage, 44, capable of permitting flow of air outwardly therethrough, under predetermined pressure, at a very slow, predetermined rate; the valve 42 being provided with check means for preventing return of air flow when pressure is relieved, as the ball, 46, seated in a suitable seat at the end of the air passage 44 and pressed into it by the spring, 47.

The airtight chamber also includes a tubular, preferably slightly pliable, conical diaphragm, 48, of rubber, which is collapsible under pressure. The diaphragm 48 is formed of a diameter and height adapted to fit within the cylindrical portion of the base 10, and is provided with an outwardly extending flange, 50, at its upper, wider end, adapted to overlie the edge of the base 10, and preferably formed with a beaded edge, 52. The diaphragm 48 is also formed with an inwardly extending flange, 54, at its inner end. A closed-end, rigid tube, 56, of a diameter to fit within the nipple 14 is secured, in air tight relation, on the exterior of the flange 54, by its own outwardly extending flange, 58, and by a plate or disc, 60, disposed against the inner face of flange 54; the flange 58 and plate 60 being held on one another and compressed against the flange 54 by rivets, 62.

The plate 60 is formed with a central slot, 64, which may receive the end of a helix, 66, formed, preferably, of bar material, that is rotatably supported on the partition or dial-plate 30, as by having its other end held in a cylindrical block, 68, that is formed with a reduced end portion, 70, that extends through the opening 32 formed in the plate 30, into the chamber 28, and carries on its projecting end an indicator hand, 72.

The device of the present invention is assembled by disposing the diaphragm 48 within the cyclindrical portion of the body 10, with the tube 56 extending into the nipple 14 and its upper flange 50 resting on the edge of the body 10. The cap 18 is then placed over the body 10, the end of the helix 66 being first inserted through the slot 64, the flange 22 of the cap 18 resting on the flange 50 of the diaphragm 48. A gland nut, 74, which engages the flange 22 of the cap 18 is then threaded and tightened on the portion 12 of the body 10 to assemble the cap 18 with the diaphragm 48 with the body 10 to form an airtight chamber with the diaphragm 48 and at the same time supporting the chamber on the body 10.

This completes the description of the illustrated embodiment of the time lapse metering device of the present invention. Its operation is as follows:

Initially, when beginning a time-lapse measurement, the diaphragm is in fully extended position, in which it may be held by the soft coil spring, 76, with the slot 64 of the plate 60 disposed on the lower portion of the helix 66 which, in that position, maintains the indicator arm 72 over the "zero" position on the dial partition 30. As the hydraulic system is put under operating pressure, this pressure is exerted through the nipple 14 on the bottom of the diaphragm 48 which compresses the air within the air-tight chamber, so that it is slowly expelled, at a predetermined rate, through the valve 42. As air escapes through the valve, the bottom of the diaphragm, including slotted plate 60, is pushed gradually inwardly, causing the helix 66 to be rotated by the rising slot 64 and to move the indicator hand gradually to indicate the time during which the hydraulic system is operative. When the hydraulic system is put out of operation, as by the inactivation of the motor with which it is associated, pressure is relieved on the air chamber, permitting the valve 42 to be closed against return of air thereinto. However, the partially collapsed diaphragm 48 maintains the position or shape it attained or had at the end of the operating period, due to the partial, irreplaceable displacement of air from the air chamber, and the indicator hand 72 remains undisturbed and likewise in its position at the end of the operating period. At the succeeding operation period of the hydraulic system, the pressure built up in the same acts on the partly collapsed diaphragm 48 to further gradually collapse it inwardly and thereby move the indicator hand 72 further away from zero position in accordance with the length of the period the hydraulic system operates and the concomitant discharge of air through the valve 42. Successive operations of the hydraulic system will successively shift the indicator hand 72 to indicate the cumulative time during which the hydraulic system was operative.

It will be clear that the tube 56, in addition to serving as part of the airtight chamber of the device, performs two additional functions in the assembly. Firstly, being of substantially close fit within the nipple 14, it guides the diaphragm 48 in the direction in which it collapses, under the pressure of the hydraulic system; maintaining the plate 60 at substantially right angles to the axis of the airtight chamber, and permits its movement on the helix 66. Secondly, it serves as a recess to receive the gradually extending end of the helix 66 as the plate 60 rides up thereon.

It will be understood that when the internal pressure of the hydraulic system, when in operation, is known, an air escape valve with a predetermined rate of air escape may be selected to provide for the evacuation of the airtight chamber over a predetermined cumulative period whose termination will be indicated by the indicator hand 72 over the dial plate 30. Such cumulative time lapse may be utilized to advise the operator of the need for attention to the hydraulic system itself, as for the replacement of the fluid or any of its operative parts, such as the fluid filter, for instance, or for attention to the mechanisms in connection with which the hydraulic system operates, as in an internal combustion engine or its associated parts, such as to its brake linings, change of body lubricant, or the like.

It will be readily apparent from the foregoing that the cumulative time lapse metering device of the present invention is of relatively simple construction consisting of relatively few and simple parts that may be easily assembled and easily and conveniently installed in a hydraulic system, in a position where it is readily accessible for reading. It will also be apparent that because of its completely mechanical operation, the device of the present invention will be sturdy and durable, will not readily go out of order, and will require a minimum of maintenance.

It will likewise be apparent that the device of the present invention may be readily and easily reset after each complete time lapse measurement, by the admission of air into the airtight chamber, in any desired manner, as by the temporary loosening of the air valve, and to be thereby reset for a second cumulative time lapse measurement.

It will be further apparent that numerous modifications and variations in the cumulative time lapse metering device of the present invention may be made by any one skilled in the art, in accordance with the principles of the invention hereinabove set forth, and without the exercise of any inventive ingenuity. I desire, therefore, to be protected for any and all such variations and modifications that may be made within the spirit of the invention and scope of the claims hereto appended.

What we claim is:

1. A cumulative time lapse metering device for hydraulic systems operating under pressure, comprising an airtight chamber, said chamber including a collapsible portion and having pressure-resisting fluid outlet means to permit slow escape of fluid under pressure therefrom at a predetermined rate, means preventing return of fluid into said chamber when pressure thereon is removed, means supporting said chamber on a conduit of the hydraulic system to expose said collapsible chamber portion to the internal pressure of the system, and means indicating the degree of collapse of said collapsible chamber portion.

2. A cumulative time lapse metering device for hydraulic systems operating under pressure, comprising an airtight, air-containing chamber, said chamber comprising a collapsible portion and having air outlet means adapted to permit slow escape of air under pressure at a predetermined rate from said chamber, means preventing the return of air into said chamber when said pressure is removed, means supporting said chamber on a conduit of the hydraulic system and exposing said collapsible chamber portion to the internal pressure of the system, and means indicating the degree of collapse of said collapsible chamber portion.

3. The device of claim 2, wherein said airtight chamber includes a rigid portion and said air escape means comprises an air escape check valve mounted on said rigid chamber portion and connected with the interior of said chamber.

4. The device of claim 2, wherein said collapsible portion is tubular, and means are provided to limit the collapse thereof in the direction of its longitudinal axis.

5. A cumulative time lapse metering device for hydraulic systems operating under pressure, comprising an airtight chamber, said chamber including a rigid tubular portion closed at one end and a collapsible tubular portion, an airtight closure at one end of said collapsible chamber portion, means connecting said tubular portions in airtight relation at their open ends, means supporting said chamber by its rigid portion on a conduit in the hydraulic system, with said closure of said collapsible chamber portion exposed to the internal pressure in said system, a pressure-resisting fluid escape valve of predetermined fluid flow rate mounted on said rigid portion and connected with the interior of said chamber, and means guiding said airtight closure to direct the collapse of said collapsible chamber portion along the longitudinal axis thereof, and means indicating the collapsed state of said collapsible chamber portion actuated by said closure.

6. The device of claim 5, wherein the means mounting said airtight chamber includes a tubular portion and the means guiding said collapsible chamber portion in the direction of collapse comprises a member secured to said airtight closure and extending into said tubular portion for axial movement therein.

7. The device of claim 5, wherein the means mounting said chamber comprises a tubular housing adapted to receive and hold therewithin the said collapsible tubular chamber portion, said tubular housing having a tubular extension of reduced cross-section at its other end forming a nipple whereby said housing may be secured in an opening formed in said conduit, said collapsible tubular portion having an outwardly offset flange at its open end adapted to rest on the edge of the open end of said housing, and means securing the edge of the open end of said rigid chamber portion against said flange of said collapsible chamber portion and the open end of said housing.

8. The device of claim 5, wherein the means mounting said chamber comprises a tubular housing adapted to receive and hold therewithin the said collapsible tubular chamber portion, said tubular housing having a tubular extension of reduced cross-section at its other end forming a nipple whereby said housing may be secured in an opening formed in said conduit, said collapsible tubular portion having an outwardly offset flange at its open end adapted to rest on the edge of the open end of said housing, and means securing the edge of the open end of said rigid chamber portion against said flange of said collapsible chamber portion and to the open end portion of said housing, and wherein the means guiding said collapsible chamber portion in the direction of collapse comprises a member secured to said airtight closure and extending into said reduced housing portion for axial movement therein.

9. The device of claim 5, wherein said rigid chamber portion is formed with a transparency in a wall portion thereof, and the means indicating the collapsed state of said collapsible chamber portion is arranged to be visible through said transparency.

10. The device of claim 5, wherein said rigid chamber portion is formed with a transparency in its closed end and a dial is disposed therewithin inwardly of said transparency and an indicator arm is disposed over said dial and means are provided for movement of said indicator arm over said dial plate, said means actuated by said airtight closure as said collapsible chamber portion is gradually collapsed.

11. The device of claim 5, wherein said rigid chamber portion and said collapsible chamber portion are separately formed, and wherein means mounting said chamber on said conduit secure said chamber portions in airtight relation to one another, said means comprising a tubular housing adapted to receive said collapsible chamber portion, said collapsible chamber portion having a flange adapted to overlie one open end of the said housing, said housing having a tubular extension of reduced cross-section at its other end forming a nipple adapted to engage within an opening formed in said conduit, the open end of said rigid chamber portion resting against the open end portion of said housing, and means engaging said end of said rigid chamber portion against said flange and on said housing end portion, and wherein said means guiding said collapsible chamber portion in collapsing direction comprises a tube closed at one end and open at its other end and secured by said other end on said airtight closure, said tube extending into said tubular housing extension.

12. The device of claim 11, wherein said means indicating the state of collapse of said collapsible chamber portion comprises a transparency, set into the end wall of said rigid chamber portion, a dial mounted within said rigid chamber portion below said transparency, an indicator arm rotatably supported on said dial, a flat spiral secured to said indicator arm and extending into said chamber, said airtight closure formed of rigid material and having a slot formed therein, said spiral extending through said slot into said tube.

13. The device of claim 12, wherein a coil spring is mounted within said chamber, said coil spring having one end disposed against said airtight closure and its other end against said dial.

14. The device of claim 11, wherein said housing and said airtight chamber are cylindrical and the wall portion of said housing adjacent its open end is externally threaded, and wherein said rigid chamber portion is formed with an outwardly extending flange at its open end adapted to rest on the open end of said housing, and a gland nut engaging said flange is threaded on said housing.

References Cited in the file of this patent

UNITED STATES PATENTS

| | | |
|---|---|---|
| 1,746,133 | Taylor | Feb. 4, 1930 |
| 2,212,930 | Cochrane | Aug. 27, 1940 |
| 2,749,700 | Seligman | June 12, 1956 |
| 3,064,628 | Canalizo et al. | Nov. 20, 1962 |